United States Patent [19]

Yokota et al.

[11] Patent Number: 5,132,726
[45] Date of Patent: Jul. 21, 1992

[54] METHOD AND APPARATUS FOR THERMAL DEVELOPING

[75] Inventors: Hideki Yokota; Hiroshi Shimizu, both of Gunma; Hiroyuki Okabayashi; Minoru Saotome, both of Kanagawa; Yasunori Yao, Tokyo, all of Japan

[73] Assignee: Fuji Photo Film Co., Ltd., Kanagawa, Japan

[21] Appl. No.: 764,607

[22] Filed: Sep. 20, 1991

[30] Foreign Application Priority Data

| Sep. 21, 1990 [JP] | Japan | 2-98481[U] |
| Sep. 21, 1990 [JP] | Japan | 2-98482[U] |
| Sep. 21, 1990 [JP] | Japan | 2-250033 |
| Nov. 29, 1990 [JP] | Japan | 2-325576 |

[51] Int. Cl.⁵ .................... G03B 27/30; G03B 27/02
[52] U.S. Cl. ..................... 355/100; 355/106; 355/132
[58] Field of Search .......... 355/100, 106, 110, 117, 355/27, 28, 77, 132

[56] References Cited

U.S. PATENT DOCUMENTS

| 4,209,251 | 6/1980 | Schroeder et al. | 355/100 |
| 4,582,423 | 4/1985 | Putnam et al. | 355/106 |
| 4,819,032 | 4/1989 | Nagumo | 355/27 |
| 4,918,486 | 4/1990 | Nakamura et al. | 355/106 |

FOREIGN PATENT DOCUMENTS

| 59-104648 | 6/1984 | Japan . |
| 59-190886 | 10/1984 | Japan . |
| 1-172046 | 12/1989 | Japan . |

*Primary Examiner*—Richard A. Wintercorn
*Attorney, Agent, or Firm*—Sughrue, Mion, Zinn, Macpeak & Seas

[57] ABSTRACT

An apparatus for thermal development of thermal fixation of a flexible sheet of photosensitive material. The apparatus includes a heating roller provided with a heating lamp inside said heating roller, a plurality of conveyance rollers disposed in pressure contact with the heating roller, so that when the sheet is put in between the heating roller and the conveyance rollers, the sheet is heated to undergo the processing, and guides, provided in pressure contact with the peripheral surface of the heating roller, for holding the sheet against the peripheral surface of the heating roller.

28 Claims, 6 Drawing Sheets

METHOD AND APPARATUS FOR THERMAL DEVELOPING

BACKGROUND OF THE INVENTION

The present device relates to a roller heating processor for subjecting a flexible sheet such as paper or film to heat processing such as thermal development and thermal fixation. More particularly, the present invention relates to a thermal development apparatus for subjecting a photosensitive material to thermal development by putting the material into contact with the peripheral surface of a heating drum.

A roller heating processor for subjecting a sheet to heat processing such as thermal development and thermal fixation typically includes a heating roller for heating the sheet, and a backup roller for pushing the sheet against the heating roller. The sheet is transported between backup roller and the heating roller, such that the sheet can be moved while in pressure contact with the heating roller so that the sheet undergoes heat processing. The surface of the backup roller is made of an elastic material, e.g., silicone rubber, so that the sheet can be securely pushed against the heating roller by the backup roller. Consequently, the backup roller is also sometimes referred to as a soft roller. Typically, such heating rollers are made of an aluminum tube to obtain high thermal conductivity of the roller, and a coating layer of Teflon or the like on the surface of the tube. The heating roller is also sometimes referred to as a hard roller. A tubular heating lamp, e.g., a halogen lamp, is provided in the heating roller so that the lamp extends in the axial direction of the roller.

The roller heating processor is required to heat the sheet at a uniform temperature for a prescribed period of time. In other words, it is necessary that the distribution of the temperature of the heating roller in the axial direction thereof be uniform, and the sheet kept in pressure contact with the heating roller for the prescribed period of time.

It is known that latent images formed on various photosensitive materials can be made visible by thermal development. For example, in a conventional thermal development apparatus, a photosensitive material is wound on the peripheral surface of a heating drum which is rotated, and the material is kept in contact with the drum for a prescribed time while being conveyed, so that the material is heated to undergo thermal development.

If the heating time is relatively short as for thermal fixation in a plain paper copying machine, a laser printer or the like, typically, one need only heat the sheet between both rollers. However, if the heating time is relatively long as in thermal development of a thermosensitive diazo paper, the rotational speed of the rollers needs to be relatively low. As a result, a problem arises in that the heating of the sheet is more time-consuming.

To solve the problem, it has been proposed to provide a plurality of backup rollers along a heating roller, and a guide is provided a short distance from the peripheral surface of the heating roller between the backup rollers, as disclosed in the Japanese Unexamined Published Application No. 172046/89. Since the guide is located a short distance from the peripheral surface of the heating roller, it is not likely that the guide will cause the sheet to be heated by the heating roller between backup rollers. Although the sheet is more likely to be heated by the heating roller between backup rollers when the guide is located in contact or pressure contact with the heating roller, another problem results. Namely, since the heating roller has a coating layer of Teflon or the like which provides a lower coefficient of friction to make it more likely that the sheet put in pressure contact with the heating roller by the backup rollers slips on the heating roller, it often occurs that the sheet does not move together with the peripheral surface of the rotating heating roller between the backup rollers but becomes caught on the fixed guide, which typically has a coefficient of friction higher than that of the heating roller. As a result, there is a problem in that the sheet slackens, causing it to wrinkle in the leading edge portion.

Additional problems result when the sheet is a film for making a second original. If the sheet is paper or the like, the guide does not cause a problem, but serves to accurately heat the sheet to subject it to development. However, if the sheet is a film for making a second original, the guide often causes a problem, namely, the leading edge portion of the sheet is not properly heated to undergo perfect development, and an imperfectly developed streak-like area extending from the leading edge portion of the sheet to the center of the surface thereof is sometimes formed. The cause of this problem is presumed to be as follows. Since the guide does not contact the heating roller between the backup rollers, the leading edge of the sheet is perfectly heated on each of the backup rollers but not sufficiently heated between the backup rollers to undergo perfect development. Further, the remaining portion of the sheet comes into tight contact with the heating roller due to the two or more backup rollers so as to be properly heated to undergo perfect development.

Also, when the sheet is a film for making a second original, there is a problem in that a spot, a projection and/or indentation can be formed on the sheet, and/or an imperfectly developed streak-like area arises on the sheet. As a result of various studies on the cause of that problem, it has been determined that the problem has a subtle relationship with the quality of the film and the conveyance speed of the backup rollers, which is described as follows. When plural backup rollers are provided, sprockets on the rollers can be made different from each other in diameter or number of teeth so as to rotate the downstream backup roller slightly faster than the upstream backup roller to pull the sheet to prevent it from slackening and wrinkling as well as to keep the sheet in tighter contact with the heating roller.

A further problem exists when the sheet is a film for making a second original. If the sheet is a film, the photosensitive material applied thereon absorbs a relatively large amount of water when in a highly humid atmosphere so that when the sheet is put in between the most upstream backup roller and the heating roller and heated by the heating roller in pressure contact therewith, the water is quickly evaporated. When the sheet is thereafter pulled by the downstream backup roller and put in tight contact with the heating roller so that the sheet is heated to undergo development, the water vapor confined in and/or on the sheet because of the imperviousness of the sheet causes the abovementioned spot, projection, indentation and/or imperfectly developed streak-like area. If the sheet is paper or the like, it is so pervious that water vapor goes out of the sheet through the reverse side thereof so as not to cause the above-mentioned problem.

The problems due to absorption of water by the photosensitive material are described more generally below. When the carrying body of the photosensitive material is made of moisture-absorbing substance such as paper, the material absorbs a certain amount of water from the ambient air or absorbs a large amount of water in a highly humid atmosphere. When a sheet of the photosensitive material having the water is heated by the heating roller of a conventional thermal development apparatus, the water is evaporated. However, the water vapor thus generated on the roller contact side of the sheet is confined between the peripheral surface of the heating roller and the side of the sheet which is in contact with the peripheral surface of the heating roller. If the water vapor remains confined between the sheet and the peripheral surface of the heating roller, the photosensitive material of the sheet will not sufficiently undergo thermal development, so that the density of the visible image on the sheet is made partially lower, which makes the visible image nonuniform. In other words, the water vapor confined between the sheet and the peripheral surface of the heating roller prevents the photosensitive material from being uniformly heated for thermal development. As a result, the densities of different portions of the visible image on the photosensitive material differ from each other. This undesirable nonuniformity becomes more conspicuous as the sheet is more rapidly conveyed.

A thermal development apparatus disclosed in the Japanese Unexamined Published Application No. 104648/84 has been proposed to attempt to overcome the absorptivity problem. In the apparatus therein disclosed, a hole or a slit is provided in a heat transfer member so that water vapor generated on the obverse and reverse sides of the photosensitive material can be discharged through the hole or the slit. However, since the heat transfer member has the hole or the slit, it is complicated to make and difficult to manufacture. Further, since the apparatus is not used alone but provided in an imaging machine or the like and used as a part thereof, the water vapor discharged through the hole or the slit stays in the machine to make the humidity therein abnormally high if the water vapor is not discharged from the machine. The water vapor in the machine is, however, itself a problem because the high humidity is undesirable for any integrated circuits provided in the machine, such as those controlling the conveyance of the photosensitive material and the density of the recorded images.

SUMMARY OF THE INVENTION

Accordingly, it is an object of the present invention to provide a method and apparatus for heating a sheet with a heating roller between backup rollers as well as on the backup rollers without wrinkling the sheet.

It is another object of the present invention to provide a method and apparatus capable of heating an entire sheet so that it undergoes perfect development on the leading edge portion of the sheet as well as on the remaining portions thereof, even if the sheet is a film.

It is still another object of the present invention to provide a roller-heating processing method and apparatus in which a sheet is subjected to perfect development without causing a spot, a projection, an indentation, an imperfectly developed streak-like area and/or the like on the sheet, even if the sheet is a film.

It is yet another object of the present invention to provide a thermal development apparatus in which water vapor generated from a photosensitive material is removed from a heating roller and the vicinity thereof through a simple construction to enhance the reliability of the apparatus and obtain a good image.

According to a first embodiment of the present invention, a flexible sheet, which is coated with a thermosensitive substance, is processed by placing it in between a heating roller and a backup roller disposed in pressure contact with the heating roller, so that the sheet is heated by the heating roller to undergo the processing. The method and apparatus according to the first embodiment are characterized in that backup rollers are provided in pressure contact with the heating roller, a guide is provided in contact with the peripheral surface of the heating roller, and the quality of the peripheral surface and that of the guide are prescribed so that the frictional force between the sheet and the heating roller is greater than the frictional force between the sheet and the guide. Since the guide is provided in contact with the peripheral surface of the heating roller, the sheet is heated by the heating roller between the backup rollers as well as on the backup rollers. Since the frictional force between the sheet and the heating roller is greater than that between the sheet and the guide, the sheet is not braked by the stationary guide but securely and smoothly moved together with the rotating heating roller so that the sheet does not slacken to cause wrinkling in the leading edge portion thereof.

According to a second embodiment of the present invention, a flexible sheet is processed by placing it in between a heating roller and a backup roller disposed in pressure contact with the heating roller, so that the sheet is heated to undergo thermal development. The method and apparatus according to the second embodiment are characterized in that backup rollers are provided in pressure contact with the heating roller, guides are provided along the peripheral surface of the heating roller between the backup rollers, where each of the guides are composed of a pair of support members, and a flexible plastic plate extending on the support members. The plastic plate is secured at one end thereof to the upstream support member with regard to the direction of forward movement of the sheet, and unsecured at the other end of the plastic plate to the downstream support member. Further, the support members are disposed near the heating roller so that a prescribed portion of the plastic plate is in pressure contact with the heating roller. Since the prescribed portion of the plastic plate of each guides are in pressure contact with the heating roller, the sheet is put into pressure contact with the heating roller so that the sheet is properly heated to undergo perfect development.

According to a third embodiment of the present invention, a flexible sheet such as paper or film which is to be processed is put in between a heating roller and a plurality of backup rollers disposed in pressure contact with the heating roller, so that the sheet is heated to undergo processing. The method according to the third embodiment is characterized in that the sheet is moved forward so that it has a slack for a while, immediately downstream of the most upstream backup roller with regard to the direction of the forward movement of the sheet. When the leading edge of the sheet is moved into an opening between the most upstream backup roller and a guide after passing the most upstream backup roller, the slack extending in a direction across the direction of the forward movement of the sheet begins to be made in the sheet so that the sheet partially separates from the heating roller. The sheet is moved with the slack remaining, so that water vapor is not confined in and/or on the trailing half of the sheet, but is allowed to go out through the opening in a direction across the direction of the forward movement of the sheet to prevent a spot, a projection, an indentation, an imperfectly developed streak-like area and/or the like from being caused on the sheet. The apparatus according to the third embodiment is characterized in that the guides are made of a flexible plastic plate and are provided between the backup rollers so that the central portion of each of the guides are in contact with the peripheral surface of the heating roller, and a means for rotating the backup rollers at nearly the same circumferential velocity as each other is provided. Since the backup rollers are rotated nearly at the same circumferential velocity as each other, the sheet is not pulled by the downstream backup roller, and thus the slack in the sheet, which occurs immediately downstream of the most upstream backup roller, remains present while the sheet is moved forward on the heating roller and the backup rollers.

According to a fourth embodiment of the present invention, a thermal development apparatus is provided in which the photosensitive material is put into contact with the peripheral surface of the rotated heating roller so that the photosensitive material is heated to undergo thermal development. The apparatus is characterized by including a conveyance unit for conveying the photosensitive material on the heating roller, an urging unit for urging the material against the peripheral surface, a gap formed between the urging unit and a portion of the peripheral surface, which extends along the axial direction of the heating roller, and an exhaust unit for discharging air from the vicinity of the open end of the gap to the outside of the apparatus.

Since the gap is formed between the urging unit and the peripheral surface of the heating roller, the urging of the photosensitive material against the heating roller by the urging unit is temporarily ceased during the conveyance of the material so that a small opening is formed between the material and the roller so that the water vapor generated from the surface of the material, which is in contact with the drum, is allowed to go out through the opening along the axial direction of the drum due to the pressure of the water vapor itself. For that reason, the water vapor does not stay between the material and the roller.

Since the exhaust unit is provided to discharge air from the vicinity of the open end of the gap to the outside of the apparatus, the water vapor having gone out of the opening is discharged outside of the apparatus. The exhaust unit is made of air holes provided in the casing of the apparatus and/or in that of an imaging machine including the apparatus, and a fan or the like for discharging air through the air holes by force. The water vapor is thus prevented from staying in either the apparatus or the machine. As a result, the photosensitive material is kept from being subjected to insufficient development due to water vapor. In other words, the photosensitive material is uniformly heated by the heating roller so as to undergo sufficient development so that the image formed on the photosensitive material is uniform in density as a whole. In addition, the humidity in the apparatus and/or the machine is prevented from rising, which enhances the reliability.

The photosensitive material may be of any type for imaging processes such as exposure and fixation as far as the material is heated for development. For example, the photosensitive material can be a photosensitive diazo material composed of a carrying body and a layer provided on the body and containing microcapsules housing a diazonium salt, a coupler and a base, as described in the Japanese Unexamined Published Application No. 190886/84. The photosensitive material is exposed to light so that a latent image corresponding to an original is formed on the photosensitive material. The photosensitive material is thereafter heated to undergo the development to make the latent image visible.

BRIEF DESCRIPTION OF THE DRAWINGS

The invention will be more clearly understood from the following description in conjunction with the accompanying drawings wherein.

DETAILED DESCRIPTION OF THE PREFERRED EMBODIMENTS

The first embodiment of the present invention is hereafter described in detail with reference to FIG. 1 of the drawings.

Figure 1:
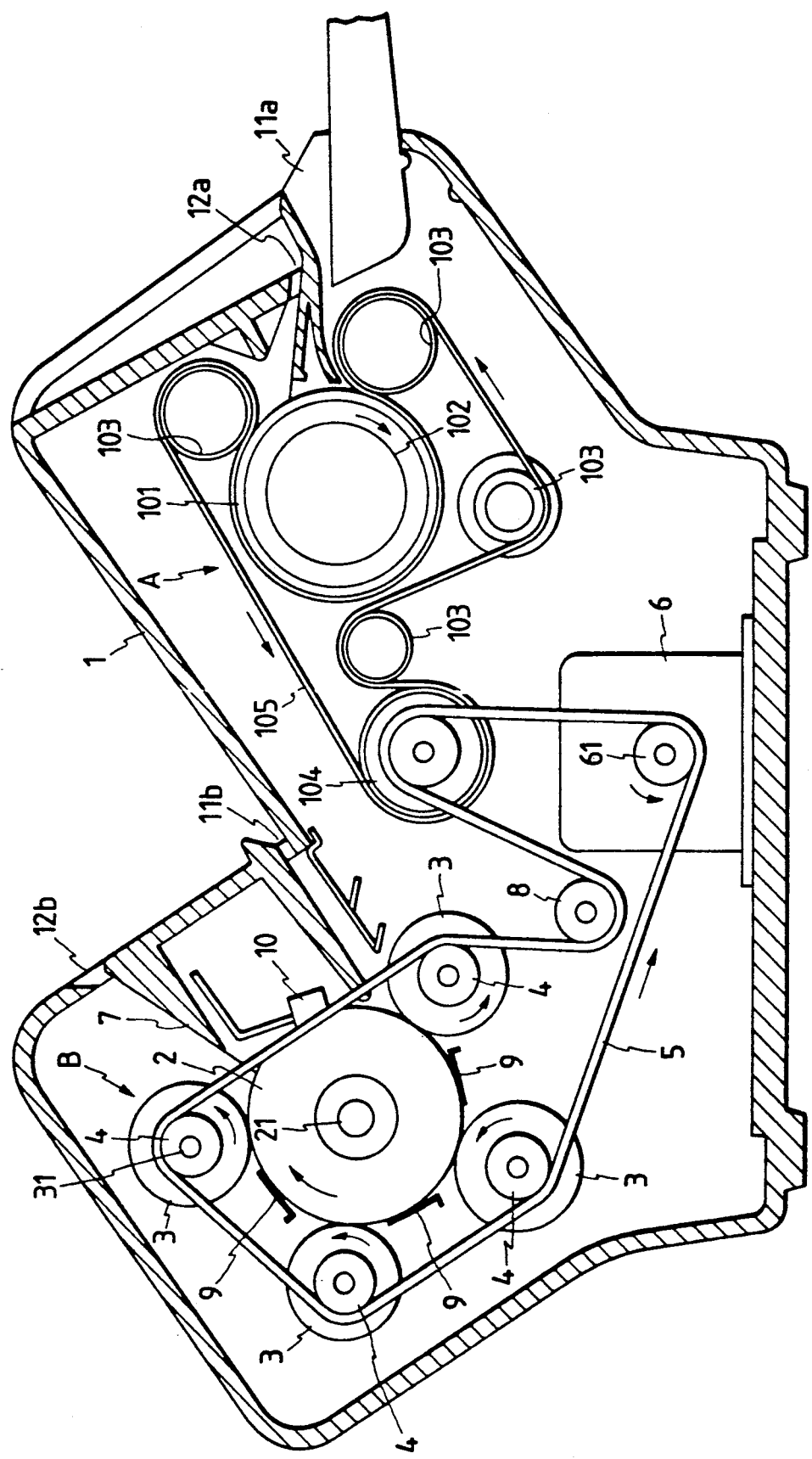
FIG. 1 is a sectional view of a roller heating apparatus which illustrates a first embodiment of the present invention.

FIG. 1 shows a diazo copying machine of the thermal development type. The machine, which has a casing 1 shaped as an inverted W at the top thereof, houses an exposure section A and a thermal development section B. The thermal development section B contains the present invention. The casing 1 has an inlet port 11a through which a sheet, which is coated with a thermosensitive diazo substance, and an original overlaid on the sheet are sent to the exposure section A, an outlet port 12a through which the sheet and the original are discharged from the exposure section A after the sheet is exposed to light through the original in the exposure section A, an inlet port 11b through which the sheet subjected to the exposure is sent to the thermal development section B, and an outlet port 12b through which the sheet subjected to thermal development in the thermal development section B is discharged therefrom.

The exposure section A has a transparent glass cylinder 101 supported rotatably, a tubular fluorescent lamp 102 rated at 100 W in power consumption and extending in the cylinder 101 along the axis thereof, four idle rollers 103, a drive roller 104, and an endless backup belt 105 wound on the rollers and the cylinder 101 and surrounding the cylinder 101 so that when the drive roller 104 is turned, the cylinder 101 is rotated in a direction shown by an arrow in FIG. 1.

The thermal development section B has a rotatably-supported heating roller 2 made of an aluminum tube coated with an Alumite layer having a large number of minute holes for a relatively high coefficient of friction, a heating lamp 21, e.g., a tubular halogen lamp of 1 kW in rated power consumption, extends in the heating roller 2 along the axis thereof, and four backup rollers 3 rotatably supported around the heating roller 2. Each of the backup rollers 3 is, for example, made of a spongy silicone rubber of high elasticity and located in pressure contact with the heating roller 2 so that the portion of the backup roller 3 which is in pressure contact with the heating roller is slightly deformed depending on the curvature of the peripheral surface of the heating roller, thus making the area of the contact of both the rollers relatively large. The thermal development section B also has sprockets 4 mounted on shafts 31 of the backup rollers 3 at one end of each of the shafts 31, an idle sprocket 8 supported rotatably, and an endless drive chain 5 engaged with the sprockets 4, the idle sprocket 8, and sprockets on the drive roller 104 and an output shaft 61 of a motor 6. Therefore, when the motor 6 turns, each of the backup rollers 3 is rotated in a direction shown by an arrow in FIG. 1. The heating roller 2 is rotated by the backup rollers 3.

In addition, the thermal development section B has a temperature sensor 10 provided in contact with the peripheral surface of the heating roller 2 to keep the temperature of the surface within a prescribed range, and guides 9 provided in contact with the heating roller 2 between the backup rollers 3. For example, each of the guides 9 is made of a flexible polyester plate having a lower coefficient of friction than that of the Alumite layer of the heating roller 2 so that the frictional force between the sheet and the heating roller 2 is stronger than that between the sheet and the guides 9. As a result, when the sheet is moved in between the heating roller 2 and the guides 9 and comes into contact with the heating roller 2 so as to undergo thermal development, the sheet is not caught on the guides 9 but securely moves together with the heating roller 2.

After a power switch (not shown) has been turned on for a short period of time, the temperature of the heating roller 2 is raised to a prescribed level and the operation of the fluorescent lamp 102 is stabilized. Thereafter, when a copying switch (not shown) is turned on, the motor 6 begins to turn. After that, the sheet, which is a film coated with the thermosensitive diazo substance, and the original overlaid on the sheet are inserted into the exposure section A through the inlet port 11a so that the sheet and the original are moved in pressure contact with the cylinder 101 by the backup belt 105, the sheet is exposed to light through the original, and the sheet and the original are then discharged from the exposure section A through the outlet port 12a.

Next, the sheet is separated from the original and put into the thermal development section B through the inlet port 11b so that the sheet is moved in pressure contact with the heating roller 2 by the backup rollers 3 and heated by the heating roller 2 to undergo thermal development. At that time, since the sheet is put into pressure contact with the heating roller 2 by the guides 9 between the backup rollers 3 as well as by the backup rollers 3 themselves, the sheet is sufficiently heated by the heating roller 2. Since the guides 9 are made of a material having a low coefficient of friction, they do not hinder the sheet from being moved forward together with the heating roller 2. Further, since the peripheral surface of the heating roller 2 has relatively high coefficient of friction, the sheet is securely and smoothly moved together with the heating roller 2 between the backup rollers 3 as well as on the backup rollers 3 so that the sheet is sufficiently and appropriately heated to properly undergo thermal development and to prevent wrinkling. The sheet is thereafter moved to a guide member 7 of the thermal development section B, and discharged from the section through the outlet port 12b.

Thus, according to the first embodiment, guides are provided in contact with a heating roller between backup rollers, and the frictional force between a sheet and the heating roller is greater than the frictional force between the sheet and each of the guides. As a result, the sheet is completely and properly heated by the heating roller and smoothly and securely moved between the backup rollers as well as on the backup rollers so as not to wrinkle the sheet.

Figure 2:
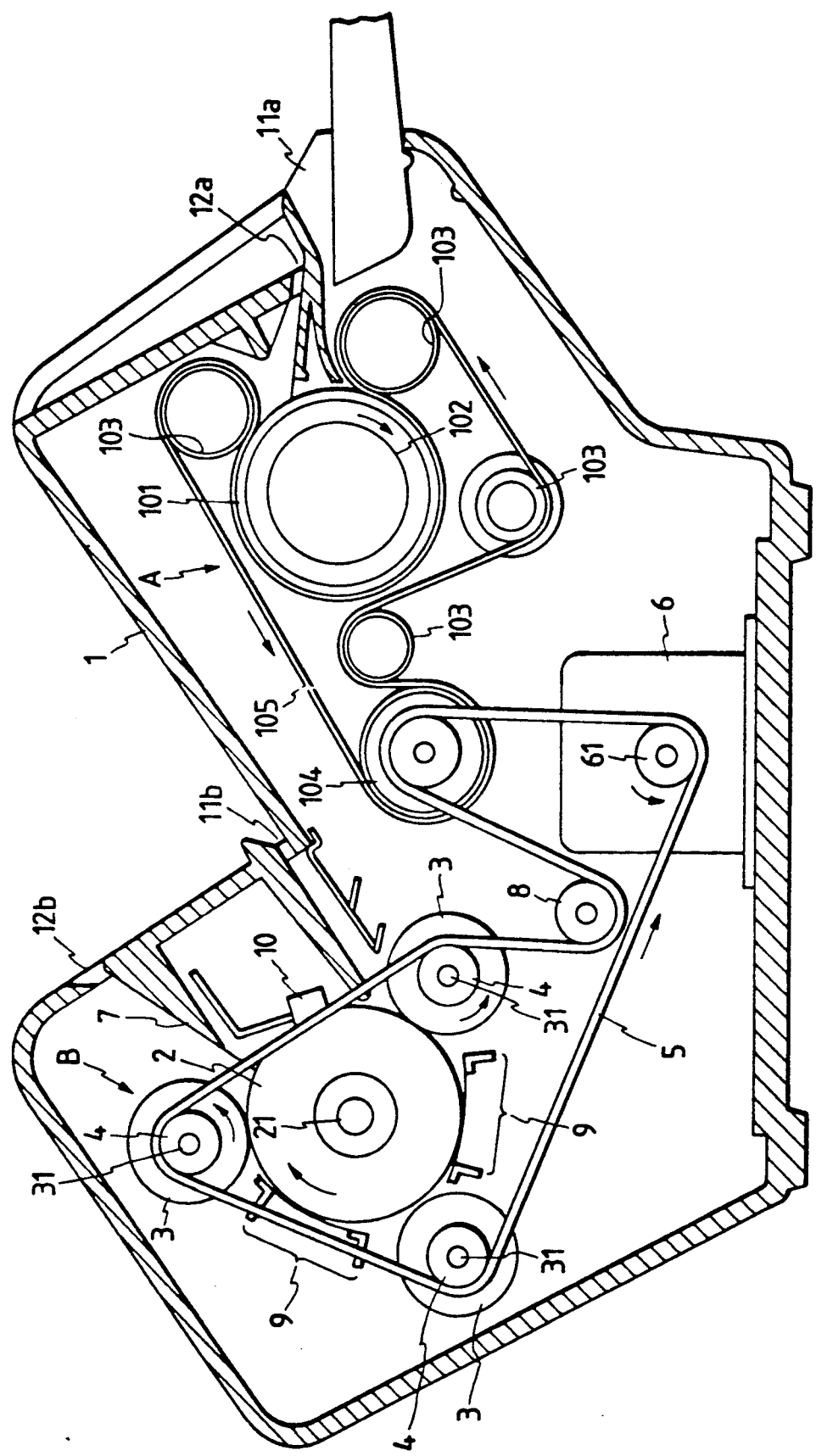
FIG. 2 is a sectional view of a roller heating apparatus which illustrates a second embodiment of the present invention.
Figure 3:
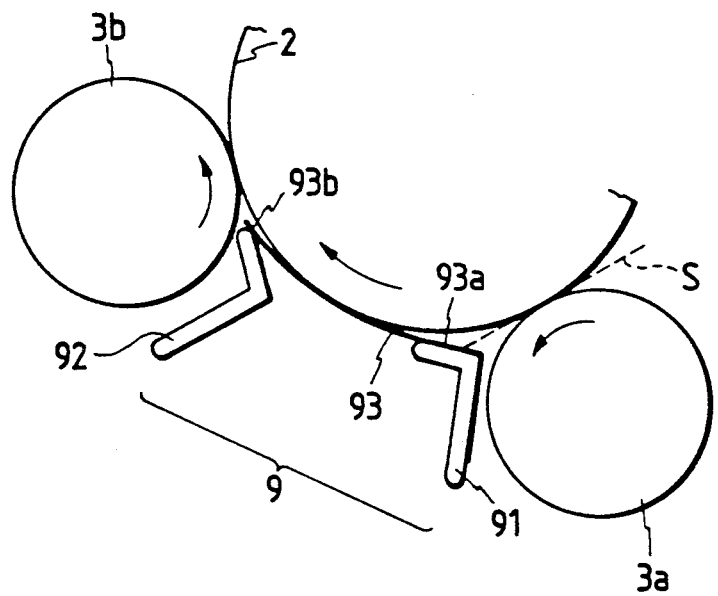
FIG. 3 is a detailed view of a roller heating apparatus according to the second embodiment of the present invention.

Now, the second embodiment of the present invention will be hereafter described in detail with reference to FIGS. 2 and 3. FIG. 2 illustrates a diazo copying machine similar to FIG. 1 in that the exposure section A is the same, but different in that the thermal development section B differs. The thermal development section B according to the second embodiment is described below.

The thermal development section B has a rotatably-supported heating roller 2, and three backup rollers 3 rotatably supported around the heating roller 2. The heating roller 2 is made of an aluminum tube coated with Teflon, and is provided with a heating lamp 21 which extends in the tube along the axis thereof. The heating lamp 21 can, for example, be a tubular halogen lamp of 1 kW in rated power consumption. Each of the backup rollers 3 is made of a spongy silicone rubber of high elasticity and located in pressure contact with the heating roller 2 so that the portion of the backup roller 3, which is in pressure contact with the heating roller, is slightly deformed depending on the curvature of the peripheral surface of the heating roller, thus making the area of the contact of both the rollers relatively large.

The thermal development section B also has sprockets 4 mounted on shafts 31 of the backup rollers 3 at one end of each of the shafts 31, an idle sprocket 8 supported rotatably, and an endless drive chain 5 engaged with the sprockets and those on the drive roller 104 and an output shaft 61 of a motor 6. Therefore, when the motor 6 is turned, each of the backup rollers 3 is rotated in a direction shown by an arrow in FIG. 2. The heating roller 2 is rotated by the backup rollers 3.

In addition, the thermal development section B has a temperature sensor 10 disposed in contact with the peripheral surface of the heating roller 2 to keep the temperature of the surface within a prescribed range, and the guides 9 provided along the peripheral surface of the heating roller between the backup rollers 3. As illustrated in FIG. 3, each of the guides 9 is composed of a pair of support members 91 and 92, each having an L shape, and a flexible plastic plate 93 provided on the support members. For example, the plastic plate 93 can be a polyester plate which is high in heat resistance temperature. The plastic plate 93 is secured at one end 93a thereof to the upstream support member 91 with regard to the direction of forward movement of the sheet, but unsecured at the other end 93b of the plastic plate to the downstream support member 92. The central portion of the plastic plate 93 is disposed in pressure contact with the heating roller 2 by a prescribed width of the plastic plate. For that purpose, the support members 91 and 92 are disposed near the heating roller 2 so that an imaginary straight line extending on the portions of the support members 91 and 92, which are located nearest the heating roller 2, intersects the heating roller 2. As a result, the sheet S is put into pressure contact with the heating roller 2 by a prescribed length of the sheet in the direction of forward movement thereof as the sheet moves from the upstream and downstream backup rollers 3a and 3b. After a power switch (not shown) has been turned on for a short period of time, the temperature of the heating roller 2 is raised to a prescribed level and the operation of the fluorescent lamp 102 is stabilized. Thereafter, when a copying switch (not shown) is turned on, the motor 6 turns. After that, the sheet, which is a film coated with a thermosensitive diazo substance, and the original overlaid on the sheet are inserted into the inlet port 11a so that the sheet and the original are moved in pressure contact with the cylinder 101 by the backup belt 105, the sheet is exposed to the light through the original, and the sheet and the original are thereafter discharged through the outlet port 12a.

Next, the sheet is separated from the original and inserted into the other inlet port 11b so that the sheet is moved in pressure contact with the heating roller 2 by the backup rollers 3. The sheet is thus heated by the heating roller 2 so that the sheet undergoes thermal development. At that time, the leading edge portion of the sheet is put into pressure contact with the heating roller 2 by the plastic plate 93 of the guides 9 as the leading edge portion moves from the upstream backup roller 3a to the downstream backup roller 3b. As a result, the sheet is sufficiently heated on the leading edge portion thereof as well as the other portion thereof so that the entire sheet sufficiently undergoes thermal development. After thermal development, the sheet is moved to the guide member 7 of the thermal development section B and then discharged through the outlet port 12b.

Thus, according to the second embodiment, guides are provided along the peripheral surface of a heating roller between backup rollers so that the guides are in pressure contact with the heating roller. Even if a sheet to be processed by the processor is a film for making a second original, the sheet is sufficiently heated so that the sheet undergoes perfect development.

Figure 4:
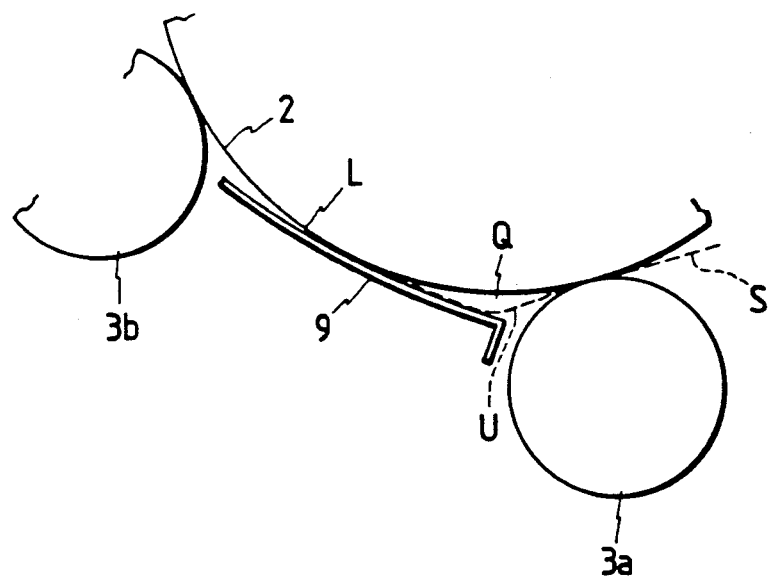
FIG. 4 is a detailed view of a roller heating apparatus according to a third embodiment of the present invention.

Now, the third embodiment of the present invention will be hereafter described in detail with reference to FIGS. 1 and 4. The third embodiment is substantially the same as the first embodiment illustrated in FIG. 1, the primary difference being in the guides. FIG. 4 illustrates the guides according to the third embodiment.

The thermal development section B has a rotatably-supported heating roller 2, and four backup rollers 3 rotatably supported around the heating roller 2. The heating roller 2, which is, for example, made of an aluminum tube coated with Teflon, surrounds a heating lamp 21 such as a tubular halogen lamp of 1 kW in rated power consumption and extends along the axis of the heating roller 2. Each of the backup rollers 3 is, for example, made of a spongy silicone rubber of high elasticity and located in pressure contact with the heating roller 2 so that the portion of the backup roller 3 which is in pressure contact with the heating roller 2 is slightly deformed depending on the curvature of the peripheral surface of the heating roller 2, thus making the area of the contact of both the rollers relatively large. The thermal development section B also has sprockets 4 mounted on shafts 31 of the backup rollers 3 at one end of each of the shafts 31, an idle sprocket 8 supported rotatably, and an endless drive chain 5 engaged with the sprockets 4, the idle sprocket 8, and sprockets on the drive roller 104 and the output shaft 61 of a motor 6. Therefore, when the motor 6 turns, each of the backup rollers 3 is rotated in a direction shown by an arrow in FIG. 1. The backup rollers 3 are the same in diameter. The sprockets 4 are also the same in diameter. The backup rollers 3 are rotated nearly at the same circumferential velocity as each other. The heating roller 2 is rotated by the backup rollers 3 along with the rotation of the latter.

In addition, the thermal development section B has a temperature sensor 10 provided in contact with the peripheral surface of the heating roller 2 to keep the temperature of the surface within a prescribed range, and guides 9 provided along the peripheral surface of the heating roller between the backup rollers 3. Each of the guides 9 is made of a flexible polyester plate which is located in contact with the heating roller 2.

The positional relationship between each guides 9 and the sheet S is described with reference to FIG. 4. When the leading edge of the sheet S has entered into a pressure contact zone L after moving on the most upstream backup roller 3a with regard to the direction of the forward movement of the sheet and coming into contact with the guides 9, the sheet forms a slack U so that the sheet partially separates from the heating roller 2 and an opening Q is formed. Water vapor, which is generated in and/or on the sheet S when it moves on the backup roller 3a, is allowed to go out through the opening Q. The leading edge of the sheet S then moves onto the downstream backup rollers 3b sequentially. Since all the backup rollers 3 are rotated nearly at the same circumferential velocity as each other, the sheet S is not pulled by the downstream backup roller 3 so that the slack U is not eliminated, and the opening Q remains formed. For that reason, when the water vapor is generated in and/or on the sheet S as the trailing half thereof moves on the most upstream backup roller 3a, the vapor is not confined but allowed to go out through the opening Q.

After a power switch (not shown) has been turned on for a short period of time, the temperature of the heating roller 2 is raised to a prescribed level and the operation of the fluorescent lamp 102 is stabilized. Thereafter, when a copying switch (not shown) is turned on, the motor 6 turns. After that, the sheet, which is a film coated with a thermosensitive diazo substance, and the original overlaid on the sheet are inserted into the exposure section A through the inlet port 11a so that the sheet and the original are moved in pressure contact with the cylinder 101 by the backup belt 105, the sheet is exposed to the light through the original, and the sheet and the original are then discharged from the exposure section through the outlet port 12a.

Next, the sheet is separated from the original and put into the thermal development section B through the inlet port 11b so that the sheet is moved in pressure contact with the heating roller 2 by the backup rollers 3. The sheet is thus heated by the heating roller 2 to undergo thermal development. At that time, the leading edge of the sheet moves on the most upstream backup roller 3 so that the sheet undergoes the slack U, and the opening Q is formed. Since the opening Q remains formed for a while as the sheet moves on the heating roller 2, the water vapor generated in and/or on the whole sheet is allowed to go out through the opening Q. For that reason, the thermal development is perfectly performed on the sheet so that a spot, a projection, a dent, an imperfectly developed streak-like area and/or the like is not made on the sheet.

In a roller-heating processing method provided in accordance with the present invention, a sheet to be processed is moved so that the sheet has a slack for a while, immediately downstream of a most upstream backup roller with regard to the direction of the forward movement of the sheet. As a result, water vapor is surely allowed to go out through an opening on the slack of the sheet so as to prevent a spot, a projection, a dent, an imperfectly developed streak-like area and/or the like from being made on the sheet. The method can be effectively practiced by an apparatus which rotates a plurality of backup rollers nearly at the same circumferential velocity as each other.

Now, the fourth embodiment of the present invention will be hereafter described in detail with reference to FIGS. 5–9.

Figure 5:
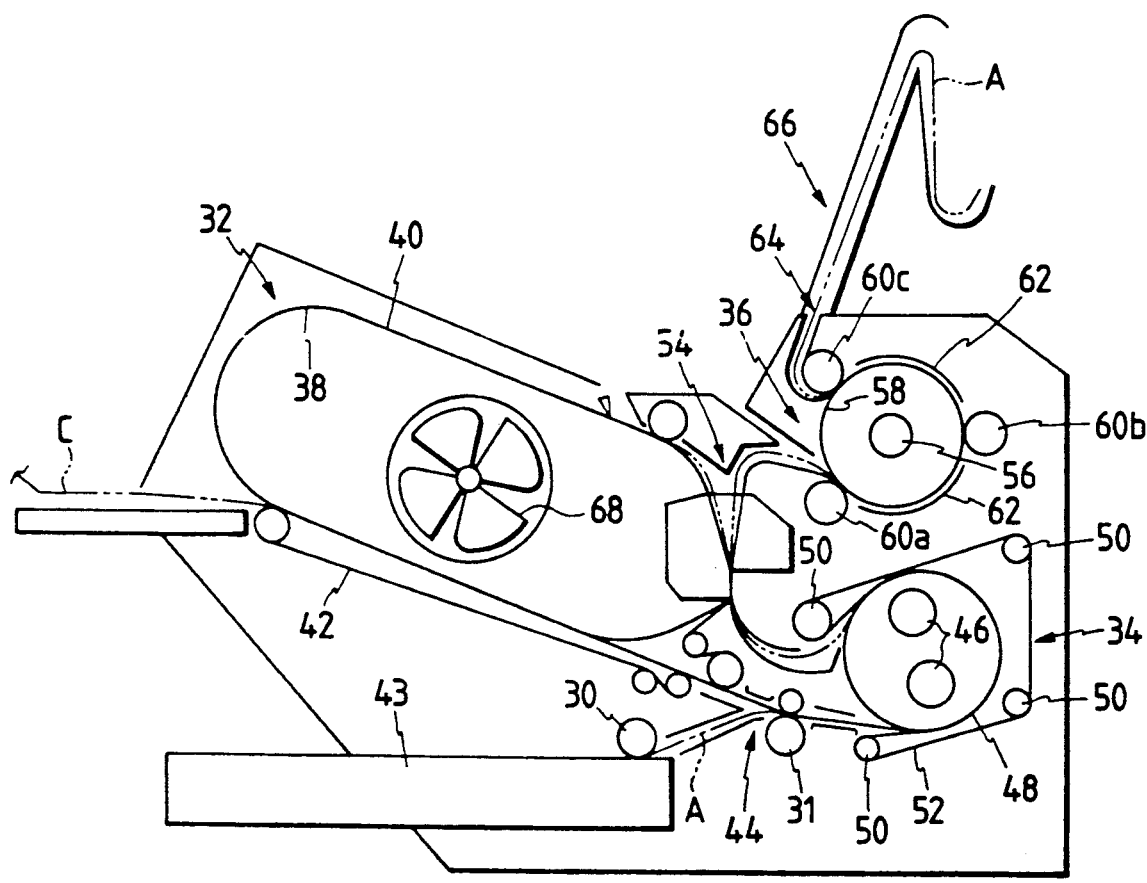
FIG. 5 is a schematic sectional view of a copying machining including a thermal development apparatus according to a fourth embodiment of the present invention.

FIG. 5 is a schematic view of a copying machine for a photosensitive diazo material. The machine includes an original conveyance section 32 for moving an original C into and out of the copying machine to circulate the original therein, an exposure section 34 in which the photosensitive material A placed on the original C is exposed to light through the original C so as to have a latent image, and a thermal development section 36 in which the material is heated after the exposure so as to undergo thermal development.

The original conveyance section 32 has a plurality of conveyance belts 40 wound in parallel with each other on the peripheral surface of a hollow guide drum 38, and other conveyance belts 42 tightly set on the former belts. The original C is conveyed by the belts 40 and 42 as the belts are revolved while they pinch the original.

A cassette 43, in which the photosensitive materials A are stored, is loaded under the original conveyance section 32 so that the photosensitive materials are sent out one after another from the cassette 43 to an overlaying section 44 by a feed roller 30 synchronously with the conveyance of the original C and placed thereon by the overlaying section. The photosensitive material A and the original C thus placed on each other are conveyed to the exposure section 34 by conveyance rollers 31.

The exposure section 34 has an exposure drum 48 housing fluorescent lamps 46, and a belt 52 supported on the drum and four belt support rollers 50 and wound on nearly three-quarters of the peripheral surface of the exposure 48. The original C and the photosensitive material A placed thereon are conveyed by the exposure drum 48 and belt 52 as the exposure drum 48 and the belt 52 are rotated while pinching the original and the photosensitive material. At that time, the photosensitive material A is exposed to the light through the exposure drum 48 and the original C so that a latent image corresponding to the original C is formed on the photosensitive material A. After the exposure, the original C and the photosensitive material A are sucked in mutually opposite directions by the suction unit of a separation section 54 so that the original C and the photosensitive material A are separated from each other. After the separation, the material A is conveyed to the development section 36.

The development section 36 has a heating drum 58 housing a halogen lamp 56, and three conveyance rollers 60a, 60b and 60c disposed in contact with the peripheral surface of the heating drum 58. Guides 62 for guiding the photosensitive material A in contact with the peripheral surface of the heating drum 58 are provided between the conveyance rollers 60a, 60b and 60c. The photosensitive material A is heated as it is conveyed by the heating drum 58 and the conveyance rollers 60a, 60b and 60c as the photosensitive material A is pinched between them, so that the photosensitive material A undergoes thermal development, thus making the latent image on the photosensitive material A visible. An endless belt may be provided instead of the conveyance rollers 60a, 60b and 60c and wound on the peripheral surface of the heating drum 58 to convey the material A. After the development, the photosensitive material A is discharged from the development section 36 through an outlet port 64 and then put in a stacker 66.

After the separation, the original C is discharged from the machine by the conveyance belts 40, or circulated on the guide drum 38 by the belts so as to be copied again through the same operation as the above.

Figure 6:
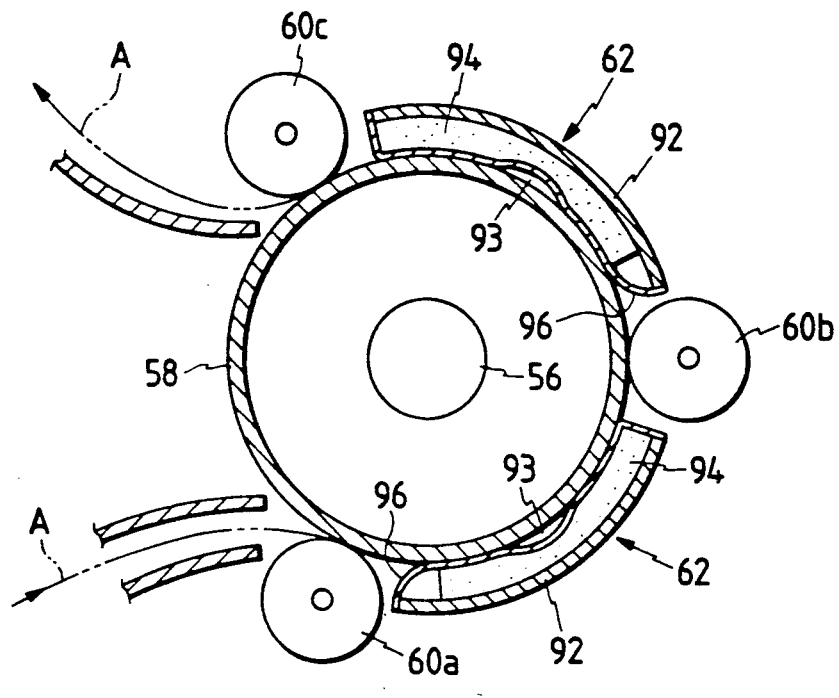
FIG. 6 is a sectional view of the thermal development apparatus illustrated in FIG. 5.

FIG. 6 is a sectional view of the thermal development section 36. The three conveyance rollers 60a, 60b and 60c are disposed in contact with the peripheral surface of the heating drum 58. The first conveyance roller 60a located where the photosensitive material A is conveyed onto the heating drum 58 is a sponge roller or the like. The second and the third conveyance rollers 60b and 60c are also sponge rollers or the like. The second conveyance roller pushes the drum 58 under the force of a spring or the like to keep the heating drum between the first and the third conveyance rollers 60a and 60c.

The guides 62 provided between the first and second conveyance rollers 60a and 60b include an elastic material support member 92 curved along the peripheral surface of the heating drum 58, an elastic material 94 having a curved surface slightly smaller in curvature than the peripheral surface of the drum, and a layer 96. Each of the support member 92, the elastic material 94 and the layer 96 is slightly larger in width than the photosensitive material A. The elastic material 94 is a belt, soft rubber or the like and secured to the inner surface of the support member 92. The inner surface of the elastic material 94 is coated with the layer 96 of a fluorine resin such as polytetrafluoroethylene which is Teflon, for example. The layer 96 is secured at the incoming and outgoing edges of the photosensitive material A to the support member 92, but need not be secured at the outgoing edge thereof to the member. The incoming edge of the elastic material 94 is located slightly upstream of the layer securing edge of the support member 92 with regard to the direction of the conveyance of the photosensitive material A so that the layer 96 slopes at the incoming edge of the photosensitive material A. As a result, the photosensitive material A conveyed by the first conveyance roller 60a moves easily in between the heating drum 58 and the layer 96 along the slope of the layer. The curved surface of the elastic material 94 is slightly smaller in curvature than the peripheral surface of the heating drum 58 except at the center of the circumferential dimension of the curved surface so that a gap 93 is defined between both the surfaces at the center. It is preferable that the dimension of the gap 93 in the radial direction of the drum 58 be about 2 to 7 mm when the diameter of the drum is 114 mm.

The guides 62 provided between the second and the third conveyance rollers 60b and 60c has the same constitution and disposition as the guides 62 provided between the first and second conveyance rollers 60a and 60b.

The photosensitive material A conveyed to the development section 36 is first conveyed by the first conveyance roller 60a and the heating drum 58 while being pinched between them. The temperature of the drum 58 is set at a prescribed level by the halogen lamp 56 in advance. The photosensitive material A pinched by the first conveyance roller 60a and the heating drum 58 is preheated by the heating drum 58 so that some of the water contained in the carrying body of the photosensitive material A is evaporated. The photosensitive material A is then conveyed on the heating drum 58 while being guided along the peripheral surface of the heating drum 58 by the guides 62, so that the photosensitive material A is heated to undergo thermal development.

Since the layer 96 is made of the fluorine resin, the photosensitive material A smoothly slips on the sheet while being moved together with the heating drum 58 by the rotation of the conveyance rollers 60a, 60b and 60c. Since the position of the support member 92 is fixed to that of the heating drum 58 and the elastic material 94 provided on the support member 92 urges the layer 96 to the drum, the photosensitive material A is moved in contact with the heating drum 58 while being pinched between the heating drum 58 and the layer 96 and guided by the guides 62, so that the material is heated to undergo thermal development. The urging force of the elastic material 94 on the sheet 96 can be modulated in terms of the quality and thickness of the elastic material 94 and the position of the support member 92 relative to that of the heating drum 58.

Figure 7:
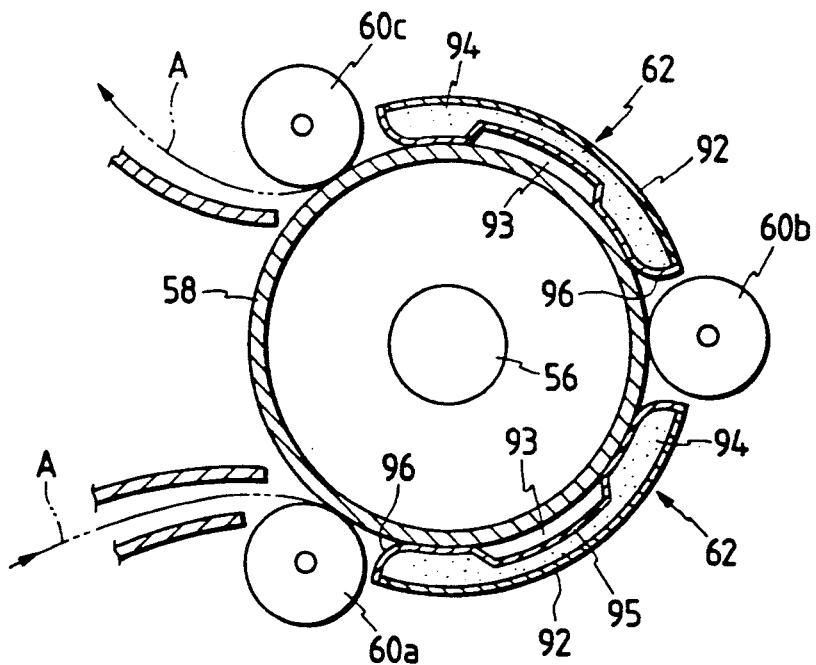
FIG. 7 is a sectional view of the thermal development apparatus illustrated in FIG. 5 showing another configuration.

When the photosensitive material A is conveyed on the peripheral surface of the heating drum 58, the photosensitive material A is heated by the heating drum 58 while being urged thereto by the elastic material 94. At that time, the water contained in the material A is evaporated from both sides of the photosensitive material A. When the leading edge of the photosensitive material A being conveyed on the heating drum 58 has reached the gap 93, the urging of the leading edge to the heating drum 58 by the elastic material 94 is temporarily ceased so that the edge temporarily separates from the peripheral surface of the heating drum 58 due to the rigidity of the photosensitive material A. Along with the further conveyance of the photosensitive material A on the heating drum 58, the leading edge of the photosensitive material A is urged against the heating drum 58 by the elastic material 94 so that the edge is put in tight contact with the peripheral surface of the heating drum 58. At that time, an area of the photosensitive material A is off the heating drum 58 and the layer 96 along the total width of the photosensitive material A so that the water evaporated from the heating drum contact side (which is an emulsion side) of the material due to the heating thereof by the heating drum 58 is allowed to go out to both the side edges of the heating drum 58 through the gap 93 between the heating drum 58 and the photosensitive material A as shown by arrows X in FIG. 8, and the other water evaporated from the carrying body side of the material is allowed to go out both the side edges of the photosensitive material 58 through a gap between the photosensitive material A and the layer 96. Since the urging force of the elastic material 94 on the photosensitive material A decreases from both the circumferential edges of the elastic material toward the gap 93 located approximately at the center of the circumferential dimension of the elastic material 94, the water vapor is allowed to move to the gap and go out through it if the water vapor is generated from the portion of the photosensitive material A, which is in tight contact with the heating drum 58. Hence, it is preferable that the gap 93 be provided near the center of the circumferential dimension of the elastic material 94. However, the gap 93 is not confined to being provided at the center, but may be provided near the end of the circumferential dimension of the elastic material 94. Though the curvature of a portion of the curved surface of the elastic material 94, which faces the heating drum 58, is made slightly larger than that of the peripheral surface of the heating drum 58 so that the gap 93 is formed, the present invention is not confined thereto but may be otherwise embodied so that an elastic material 94 is provided with a recess 95 to form a gap 93 as shown in FIG. 7, to temporarily cease the urging of the photosensitive material A to the heating drum 58.

The photosensitive material A is conveyed at a speed of 17 to 180 mm/sec. in the copying machine. If the photosensitive material A is conveyed at a relatively low speed, the total amount of heat imparted to the material is relatively large to make the density of the visible image on the material so high as a whole that even if the image has a nonuniformity due to excessive development, the nonuniformity is not conspicuous. If the photosensitive material A is conveyed at a relatively high speed of more than 100 mm/sec., the total amount of heat imparted to the photosensitive material A is relatively small to make the density of the visible image on the material so low as a whole that if the image has a nonuniformity due to insufficient development, the nonuniformity is conspicuous. Since the gap 93 is provided between the peripheral surface of the heating drum 58 and the elastic material 94 so that the water vapor generated from the photosensitive material A is allowed to go out through the gap, the development of the latent image on the photosensitive material A is prevented from being made insufficient by the water vapor which would otherwise render the shade of the visible image on the photosensitive material A nonuniform as a whole, even if the photosensitive material A is conveyed at a relatively high speed.

The embodiment described above may be modified so that the second conveyance roller 60b is not provided, and only one guides 62 is provided between the first and the third conveyance rollers 60a and 60c to guide the photosensitive material A along the heating drum 58 from the first conveyance roller 60a to the third conveyance roller 60c.

Figure 8:
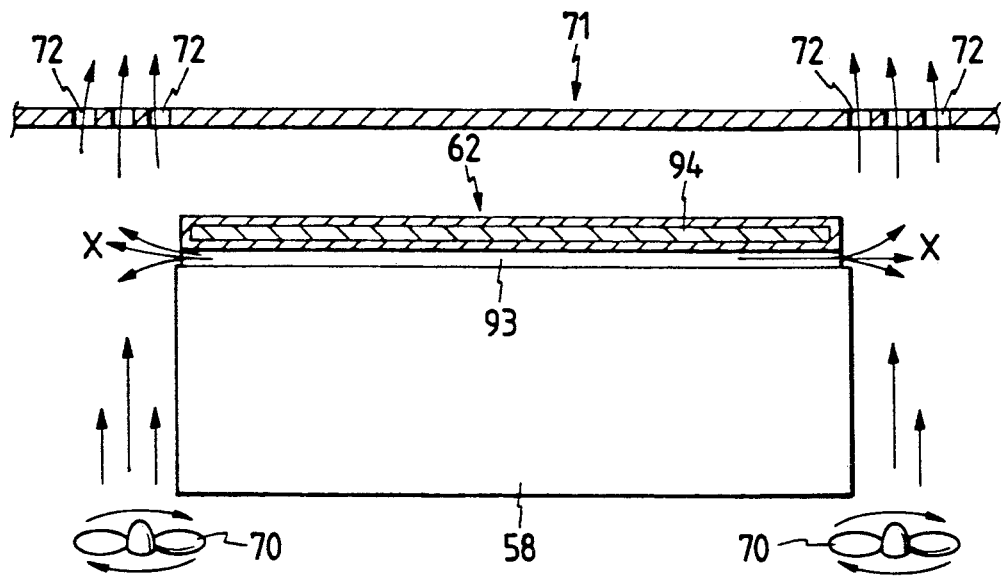
FIGS. 8 and 9 are structural views illustrating discharge of water vapor.
Figure 9:
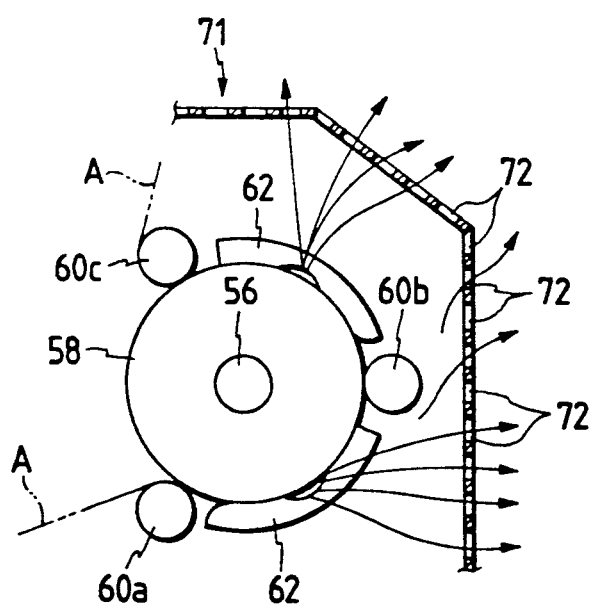

FIGS. 8 and 9 are structural views of the thermal development apparatus illustrating the discharge of the water vapor to the outside of the apparatus. The water vapor having gone out through the gap 93 along the axial direction of the heating drum 58 as shown by the arrows X is blown to the casing 71 of the copying machine by a fan 70 so as to be discharged from the machine. The fan 70 is provided exclusively for the blowing. However, air discharged by the suction unit for separating the original C and the photosensitive material A from each other in the separation section 54 may be used instead of the fan 70 to discharge the water vapor. The use of the discharged air is simpler than that of the fan 70. If the suction unit is used to discharge the water vapor, an air duct is provided to blow the water vapor to the casing 71. The casing 71 has air holes 72 through which air can pass from the inside of the machine to the outside thereof. It is preferable that the air holes 72 are provided in the portions of the casing 71 which correspond to both the side edges of the heating drum 58, to prevent heat loss from the drum. The water vapor is blown to the casing 71 by the fan 70 so that the vapor goes out of the machine through the air holes 72. Since the water vapor does not stay in the machine, the humidity therein does not rise, so that the image on the photosensitive material A is good and the reliability of a control circuit or the like is enhanced. Since the air holes 72 are provided in the portions of the casing 71, which correspond to both the side edges of the heating drum 58, the heat does not part from the drum. For that reason, the temperature of the heating drum 58 is kept from falling, the electric power required for maintaining the temperature at the prescribed level is reduced, and the warm-up time of the drum at the beginning of the operation thereof is shortened.

Although the space between the thermal development section 36 and the casing 70 is empty, the thermal development section 36 may be wrapped with a cover or the like to prevent the heat of the section from affecting the other part of the copying machine. If the thermal development section 36 is wrapped with a cover, air holes are provided in the cover to discharge the water vapor out of the cover and then discharge the vapor out of the machine to prevent the humidity therein from rising.

In a thermal development apparatus provided in accordance with the present invention, water evaporated from the surface of a photosensitive material, which is in contact with a heating drum as the photosensitive material is heated by the drum, is allowed to go out, along the axial direction of the drum, through a gap formed between an urging unit and the peripheral surface of the heating drum and extending along the axial direction, and the water vapor having gone out to both the side edges of the heating drum is discharged through outlet holes by a fan or the like. Therefore, the photosensitive material is prevented from undergoing nonuniform development due to the water vapor. In other words, the material is uniformly heated by the heating drum to undergo uniform development so that an image uniform in shade as a whole is formed on the photosensitive material. Further, the humidity in the apparatus and an imaging machine or the like, which employs the apparatus, is prevented from rising, so that the reliability of the apparatus and the machine or the like is enhanced.

What is claimed is:

1. An apparatus for processing a flexible sheet, comprising:
    a heating roller provided with a heating lamp inside said heating roller;
    a plurality of conveyance rollers disposed in pressure contact with said heating roller, so that when said sheet is put in between said heating roller and said conveyance rollers, said sheet is heated to undergo said processing; and
    guide means, provided in pressure contact with the peripheral surface of said heating roller, for holding said sheet against the peripheral surface of said heating roller,
    wherein the quality of the peripheral surface and that of said guide means are prescribed so that the frictional force between said sheet and said heating roller is greater than the frictional force between said sheet and said guide means.

2. An apparatus as recited in claim 1, wherein said guide means is disposed in between said conveyance rollers.

3. An apparatus as recited in claim 2, wherein said apparatus is a diazo copying machine, and said processing is thermal development processing.

4. An apparatus as recited in claim 3, wherein said heating roller comprises an aluminum tube coated with a layer having a plurality of minute holes.

5. An apparatus as recited in claim 3, wherein said conveyance rollers comprise silicone rubber which slightly deforms when in pressure contact with the peripheral surface of the heating roller.

6. An apparatus as recited in claim 1, wherein said guide means comprises a flexible polyester plate.

7. An apparatus as recited in claim 1, wherein said guide means comprises a pair of support members, and a flexible plate provided on said support members.

8. An apparatus as recited in claim 1, wherein said guide means comprises a flexible plate provided between said conveyance rollers so that a central portion of said flexible plate is in contact with the peripheral surface of said heating roller.

9. An apparatus as recited in claim 1, wherein said guide means comprises a gap formed between said guide means and a portion of the peripheral surface of said heating roller, said gap extends along the axial direction of said heating roller, and both sides of said sheet are exposed to air in said gap.

10. An apparatus as recited in claim 9, wherein said apparatus further comprises exhaust means for discharging air from the vicinity of said gap to the outside of said apparatus.

11. An apparatus as recited in claim 10, wherein water vapor trapped between said heating roller and said sheet can be removed in said gap.

12. An apparatus for processing a flexible sheet, comprising:
    a heating roller provided with a heating lamp inside said heating roller;
    a plurality of conveyance rollers disposed in pressure contact with said heating roller, so that when said sheet is put in between said heating roller and said conveyance rollers, said sheet is heated to undergo said processing; and
    guide means, provided along the peripheral surface of said heating roller between said conveyance rollers, for holding said sheet against the peripheral surface of said heating roller, each of said guide means comprising a pair of support members, and a flexible plate provided on said support members, said support members are disposed near said heating roller so that a prescribed portion of said flexible plate is in pressure contact with said heating roller.

13. An apparatus as recited in claim 12, wherein said flexible plate is plastic.

14. An apparatus as recited in claim 12, wherein said support members comprise an upstream support member and a downstream support member, and said flexible plate has first and second ends, and
    wherein the first end of said flexible plate is secured to the upstream support member, and the second end of said flexible sheet is unsecured to the downstream support member.

15. An apparatus as recited in claim 12, wherein the prescribed portion corresponds to a central portion of said flexible sheet, the central portion is disposed in pressure contact with said heating roller to hold said sheet against the peripheral surface of said heating roller.

16. An apparatus as recited in claim 12, wherein said apparatus is a diazo copying machine, and said processing is thermal development processing.

17. An apparatus as recited in claim 12, wherein said heating roller comprises an aluminum tube coated with a layer of a chemical substance.

18. An apparatus for processing a flexible sheet, comprising:
a heating roller provided with a heating lamp inside said heating roller;
a plurality of conveyance rollers disposed in pressure contact with said heating roller, so that when said sheet is put in between said heating roller and said conveyance rollers, said sheet is heated to undergo said processing;
guide means, provided in pressure contact with the peripheral surface of said heating roller, for holding said sheet against the peripheral surface of said heating roller, said guide means comprises a flexible plate provided between said conveyance rollers so that a central portion of said flexible plate is in contact with the peripheral surface of said heating roller; and
means for rotating each of said conveyance rollers at nearly the same circumferential velocity.

19. An apparatus as recited in claim 18, wherein said conveyance rollers including an upstream roller and a downstream roller, and
wherein said guiding means guides said sheet from said upstream roller against said heating roller such that a slack forms in said sheet immediately downstream from said upstream roller.

20. A method for thermal development processing a flexible sheet using a heating roller and rollers disposed in pressure contact with the heating roller, the rollers including an upstream roller and a downstream roller, comprising:
(a) moving the sheet between the upstream roller and the heating roller;
(b) guiding the sheet from the upstream roller against the heating roller such that a slack forms in the sheet immediately downstream from the upstream roller; and
(c) moving the sheet between the downstream roller and the heating roller.

21. A method as recited in claim 20, wherein said method further comprises (d) rotating each of the rollers at nearly the same circumferential velocity.

22. A method as recited in claim 20, wherein said guiding comprises:
(i) separating the sheet from the heating roller to form an opening immediately downstream from the upstream roller; and
(ii) guiding the sheet against the heating roller between the upstream roller and the downstream roller but after the opening.

23. A thermal development apparatus for thermal development of a photosensitive material, comprising:
a heating drum;
conveyance means for conveying said photosensitive material in contact with the peripheral surface of said heating drum;
an urging means for urging said photosensitive material to the peripheral surface of said heating drum; and
a gap formed between said urging means and a portion of the peripheral surface of said heating drum, said gap extends along the axial direction of said heating drum, and both sides of the photosensitive material are exposed to air in said gap.

24. A thermal development apparatus as recited in claim 23, wherein said apparatus further comprises exhaust means for discharging air from the vicinity of said gap to the outside of said apparatus.

25. A thermal development apparatus as recited in claim 24, wherein water vapor trapped between said heating drum and the photosensitive material can be removed in said gap.

26. An apparatus for thermal processing a flexible sheet of photosensitive material, comprising:
a heating roller;
conveyance means for conveying said photosensitive material in contact with the peripheral surface of said heating roller; and
a plate, provided in pressure contact with the peripheral surface of said heating roller, for holding said sheet against the peripheral surface of said heating roller,
wherein the quality of the peripheral surface and that of said plate are prescribed so that the frictional force between said sheet and said heating roller is greater than the frictional force between said sheet and said plate.

27. An apparatus as recited in claim 26, wherein said plate is provided between said conveyance rollers so that a central portion of said plate is in contact with the peripheral surface of said heating roller.

28. An apparatus as recited in claim 26, wherein said plate comprises a gap formed between said plate and a portion of the peripheral surface of said heating roller, said gap extends along the axial direction of said heating roller, and both sides of said sheet are exposed to air in said gap.

* * * * *